United States Patent [19]

Jackson

[11] 4,264,442
[45] Apr. 28, 1981

[54] LIQUID TRAPS

[76] Inventor: Dirk C. Jackson, 1629 SE. 10th Ter., Suite 6, Fort Lauderdale, Fla. 33316

[21] Appl. No.: 42,781

[22] Filed: May 29, 1979

[51] Int. Cl.³ .............................................. B01D 35/18
[52] U.S. Cl. .................................... 210/86; 210/114; 210/185
[58] Field of Search ................ 210/86, 46.1, 104, 109, 210/111, 114, 115, 185, 186

[56] References Cited

U.S. PATENT DOCUMENTS

| | | | |
|---|---|---|---|
| 2,325,925 | 8/1943 | Waugh | 210/114 |
| 3,199,676 | 8/1965 | May | 210/114 |
| 3,315,737 | 4/1967 | Welch | 210/185 X |
| 3,568,835 | 3/1971 | Hansen | 210/115 X |
| 3,685,655 | 8/1972 | Muller | 210/114 |
| 4,010,101 | 3/1977 | Davey | 210/86 |

FOREIGN PATENT DOCUMENTS 1062701 3/1967 United Kingdom .

Primary Examiner—John Adee
Attorney, Agent, or Firm—Harness, Dickey & Pierce

[57] ABSTRACT

A trapping device for trapping foreign liquids having a specific gravity greater than that of a supply liquid comprises a settling chamber defined primarily by a hollow casing, and inlet and outlet chambers in the settling chamber. An inlet and an outlet lead to and from the inlet and outlet chambers, which are separated by an imperforate wall. A heated foraminous wall is arranged so that fluid passing through the chamber from the inlet to the outlet passes through the foraminous wall, which causes separation of the foreign liquid from the supply liquid. The heating of the foraminous wall may be controllable to enable it to be heated sufficiently to clean the foraminous wall. An educer-operated drain is provided for draining settled foreign liquids from the chamber.

8 Claims, 3 Drawing Figures

LIQUID TRAPS

FIELD OF THE INVENTION

This invention relates to a trapping device for connection to a liquid supply line for trapping foreign liquids contained in the supply liquid and having a specific gravity greater than that of the supply liquid and is particularly suitable for connection to a liquid supply line such as a fuel supply line for an internal combustion engine.

BACKGROUND OF THE INVENTION

Such a device is described in U.K. Pat. No. 1,062,701. This device has walls defining a settling chamber having an inlet opening and an outlet opening in its upper region. Means are provided for connecting the chamber in series with the liquid supply line. A float is located in the chamber and has a specific gravity higher than that of the supply liquid and lower than that of the foreign liquids. Electrical switch means having means for connection to an electrical warning signal are operable by the float so that when the float is in an upper position the circuit is closed and when the float is in a lower position the circuit is open. A warning signal is thus produced when the upper surface of the foreign liquids trapped in the settling chamber reaches a predetermined level.

A foraminous element is provided in the settling chamber and arranged in such a way that liquid flowing from the inlet opening to the outlet opening will pass at least once through the foraminous element.

A drain outlet valve is provided for the lower region of the settling chamber to permit foreign liquids which are separated out and trapped in the settling chamber to be drained from the chamber.

An improved device shown in U.S. Pat. No. 4,010,101 comprises a tubular side wall having upper and lower ends, upper and lower end pieces defining sockets releasably receiving the upper and lower ends of the side wall, and sealing means forming seals between the end pieces and the side wall, a settling chamber being defined primarily by the side wall and the end pieces. Inlet and outlet chambers are provided in the settling chamber and adjacent to said upper end piece, an inlet leading through the upper end piece into said inlet chamber and an outlet leading through the upper end piece from the outlet chamber. A substantially imperforate wall separates the inlet and outlet chambers. The imperforate wall is an improved wall comprising a tubular hub and a pair of wing means at opposite sides of the hub. These wing means each diverge outwardly away from the hub and serve to increase circulation of supply fluid flowing through the device.

Flow paths connect said settling chamber with said inlet and outlet chambers and foraminous wall means are arranged across the flow paths whereby fluid passing through the chambers from the inlet to the outlet passes through the foraminous wall means.

The foraminous wall means each form part of a substantially cylindrical wall so that an annular cavity is defined about this wall. The wing means can cause circulation of supply fluid through this cavity and through the foraminous wall means to increase the efficiency of the wall means.

BRIEF DESCRIPTION OF THE INVENTION

The present invention provides a trapping device for a liquid supply line for trapping foreign liquids contained in a supply liquid, said foreign liquids having a specific gravity greater than that of the supply liquid, the device comprising a tubular casing having an open upper end, an upper end piece sealingly mounted on the upper end of the casing, a settling chamber defined at least partly within the casing, inlet and outlet chambers in an upper zone of said settling chamber, an inlet leading into said inlet chamber, an outlet leading from said outlet chamber, a substantially imperforate wall separating said inlet and outlet chambers, flow paths connecting the settling chamber with the inlet and outlet chambers, and foraminous wall means partly defining said inlet and outlet chambers, said foraminous wall means being arranged across the flow paths whereby liquid passing through the chambers from the inlet to the outlet passes through said foraminous wall means for separating foreign liquids from said supply liquid.

Heating means are provided for heating said foraminous wall means at least in the region of one said flow path, and detecting means are provided for detecting the presence of a predetermined amount of foreign liquids in said settling chamber and connectable to an electrical signal circuit for responding by emitting a signal in response detection of said foreign liquids. The heating means may comprise at least one heater mounted in said settling chamber adjacent to said foraminous wall means, for example, on one or both of said inlet and outlet chambers adjacent to said foraminous wall means.

The invention may be incorporated in a fuel supply system for an engine: the fuel supply system comprising a settling chamber defined by a casing and an end wall and having a lower zone for receiving foreign liquids having a specific gravity higher than that of fuel for the engine, detecting means for detecting the presence in the settling chamber of foreign liquids having a specific gravity higher than that of fuel for said engine, said detecting means including an electrical signal circuit for emitting a signal in response to detection of such foreign liquids, inlet and outlet chambers in an upper zone in said settling chamber, an inlet leading into said inlet chamber, an outlet leading from said outlet chamber, foraminous wall means partly defining said inlet and outlet chambers whereby fuel passing through the chambers from the inlet to the outlet passes through said foraminous wall means, and heating means connected to an electrical power supply source for heating said foraminous wall means at least in a region where fuel passes through said foraminous wall means.

A drain outlet valve may be provided in the casing for draining the settling chamber. The drain outlet valve may comprise a non-return valve including educer means connected to a compressed air source of said engine for creating low pressure conditions for opening said non-return valve and draining foreign liquids from said settling chamber. The educer means may comprise a valve normally preventing flow of compressed air from creating said low pressure conditions, said valve being operable by an electrical signal emitted by said electrical signal circuit in response to detection of the predetermined quantity of foreign liquids in the settling chamber.

The heating means may be connected to said power supply source by variable power supply control means for controlling the heating of said foraminous wall means. This enables the foraminous wall means to be heated sufficiently to dislodge foreign particles which have been deposited by liquids flowing through the foraminous wall means.

The invention further provides a trapping device comprising a settling chamber defined by a casing and having a lower zone for receiving foreign liquids having a specific gravity higher than that of a supply liquid, detecting means for detecting the presence in the settling chamber of such foreign liquids and means for separating such foreign liquids from the supply liquid as the foreign liquids and supply liquid pass through said chamber, and an educer operated drain outlet valve for draining the settling chamber, said educer operated drain outlet valve comprising a valve seat arranged adjacent to a bottom region of said settling chamber and encircling a drain opening, a valve member for engaging said valve seat for closing said drain opening, means biassing said valve member against said valve seat for normally retaining the drain opening in its closed condition, a valve chamber adjacent to said valve seat and receiving at least said valve member, and an educer having a flow passage connectable to a compressed air source whereby flow of compressed air through said air passage creates suitable low pressure conditions in said valve chamber for moving said valve member clear of said valve seat and permitting foreign liquids to flow through said drain opening and from said settling chamber.

The educer may comprise an educer chamber and an educer nozzle projecting into the educer chamber for creating relatively low pressure conditions in said educer chamber, the educer chamber being in fluid communication with the valve chamber. A control valve may be connected between said educer and said compressed air source for controlling flow of compressed air to the educer and thereby controlling operation of the drain outlet valve.

The detecting means may be connected to an electrical signal circuit for emitting a signal to open and control valve in response to detection of a predetermined quantity of foreign liquids in said settling chamber.

BRIEF DESCRIPTION OF THE DRAWINGS

The invention will now be described with reference to the accompanying drawings in which a particular embodiment of the invention is shown by way of example.

In the drawings.

DETAILED DESCRIPTION OF THE DRAWINGS

Figure 1:
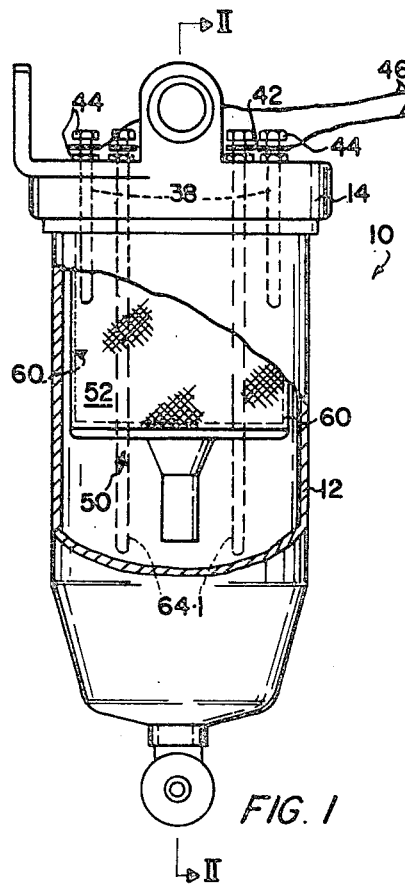
FIG. 1 is a side view, partly in section, of a trapping device according to the invention.
Figure 2:
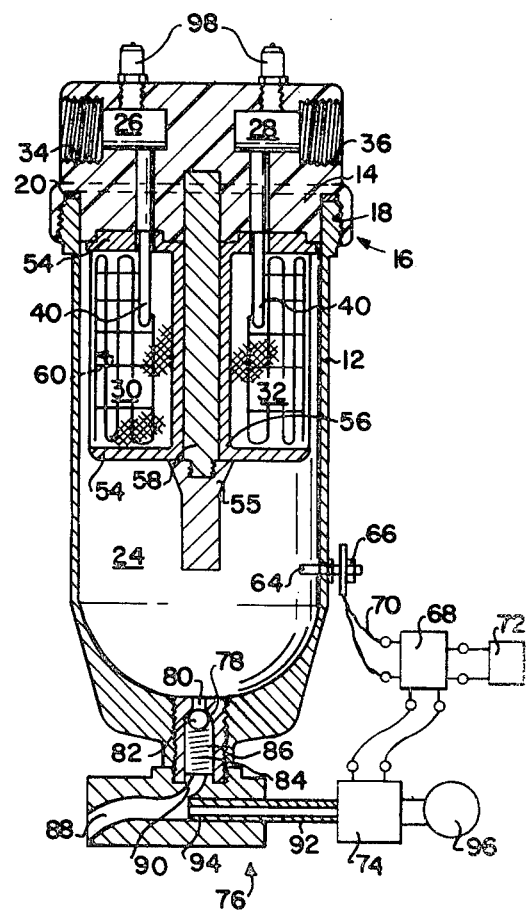
FIG. 2 is a section taken on line II—II of FIG. 1 but showing the device filled with liquid.

Reference numeral 10 indicates generally a trapping device for connection to a liquid supply line, such as a fuel line, for trapping foreign liquids, such as water, contained in the supply liquid and having a specific gravity greater than that of the supply liquid. The device comprises a hollow casing 12 and a transversely disposed upper end wall 14 which has a peripheral zone defining a socket 18 for receiving the upper end of the casing 12. The end wall and casing are held in an assembled condition by means of complementary threads on the casing and in the socket.

Between the casing 12 and end wall 14 there is provided an O-ring 20, of resilient material such as rubber to ensure that a sealed settling chamber 24 is defined by the casing and the end wall.

The end wall 14 is provided with an inlet passage 26 and an outlet passage 28 which communicate respectively with an inlet chamber 30 and an outlet chamber 32. The passages 26 and 28 are provided with screw-threaded regions 34 and 36 by means of which the device can be connected in series in a liquid supply line.

The end wall 14 is moulded of electrically insulating synthetic plastics material. In this end wall there are mounted spaced electrical conductors 38, the conductors being electrically insulated from one another. Each conductor 38 has a contact region 40 and a screw-threaded region 42 to receive nuts 44. The length of penetration of each conductor 38 into the settling chamber 24 is adjustable by means of the threaded region 42 and the nuts electrical leads 46 are clamped onto the conductor between the nuts 44, and connect the conductors to power source 48.

In the settling chamber 24 there is provided a cage 50 having a circular peripheral side wall 52 of foraminous material such as a fine gauge gauze, for example, of metal such as stainless steel. The cage 50 further comprises spaced transversely disposed end walls 54 of synthetic plastics material to which is secured a tubular hub 56 having a bore through which a shank 58 extends. A pair of wings are formed integrally with the end wall 54 and with the tubular hub 56 to provide an imperforate wall dividing the cage 50, and thus providing the chambers 30 and 32.

The cage 50 is maintained in position by a shoulder element 55 which is screwed onto the bottom of shank 58 and acts against the lower end wall 54. The arrangement is such that the holes in the upper wall 54 and the chambers defined in the cage 50 are respectively in register with the inlet passage 26 and the outlet passage 28, whereby the liquid flowing through the device from the inlet to the outlet opening passes twice through the foraminous side wall 52.

The liquid leaving the inlet chamber tends to flow in a circular path about the cage 50. It then enters the outlet chamber 32 by impinging against the wall 52 at a slight angle to the wall over most of the wall length and then passing through the wall 52.

Figure 3:
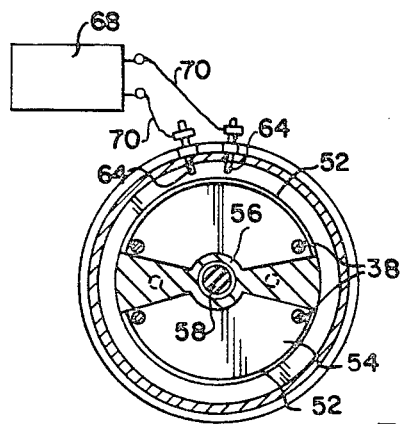
FIG. 3 is a section on line III—III of FIG. 1.

Mesh-like heaters 60 are provided in each chamber 30 and 32. These heaters include sinusoidal resistance elements coated with insulating material and located within and adjacent to the foraminous side wall 52. The opposite ends of each resistance element are connected to the regions 40 of respective electrical conductors 38, forming a continuous electrical path through the sinusoidal resistance elements. The elements of the heaters extend upwardly and downwardly within the chambers 30 and 32, and adjacent passes thereof are connected by transversely extending insulating elements holding the resistance elements in place. Alternatively, perforated plate-like elements could be used. The heaters 60 contain openings larger than those in the foraminous side walls 32 so that they do not significantly obstruct the flow of liquid through the side walls. It is possible that only a single heater could be used. Such a heater could extend from one of the conductors 38 at the right hand side of the device of FIG. 3, round within the foraminous wall, and back to the second conductor at the right of FIG. 3. The other conductors 38 would be omitted.

At the lower region of the casing 12, there are provided spaced detector contacts 64 projecting into the chamber 24. These contacts are provided with screw and nut connectors 66 which are themselves connected to a remote electrical signal circuit 68 by the leads 70. The contacts 64 will detect changes in resistance when the level of foreign liquids, e.g. water, in the chamber 24 reaches the level of the contacts, and the electrical signal circuit will emit a signal in response to the detection of the foreign liquids. This signal may be transmitted to a visual or audible warning device 72 and/or to a control valve 74, the purpose of which will be explained later.

In an alternative form, contacts 64 could be replaced by probe-like contacts 64.1 (shown only in chain lines) passing through end wall 14 and through holes in the imperforate wall dividing the cage 50. The leads 70 would then be connected to screw and nut connectors on contacts 64.1.

In the bottom of the casing 12, there is provided a drain valve assembly 76 in the form of an educer-operated drain outlet valve for draining the settling chamber. The valve 76 has a valve seat 78 adjacent to the bottom of the settling chamber and encircling a drain opening 80. A valve member in the form of a ball 82 is biassed against the valve seat 78 via spring 84 for normally retaining the drain opening in its closed condition. A valve chamber 86 containing the spring is connected to an educer chamber 88 by a passage 90.

A flow path 92 having a nozzle 94 projecting into the educer chamber 88 is connected to a compressed air source 96 by way of the control valve 74. The control valve normally prevents flow of air from the compressed air source 96 through the flow path 92 but permits flow of compressed air through the flow path on receiving a signal from the electrical signal circuit 68. The arrangement is such that flow of compressed air through the flow path creates suitable low pressure conditions in the valve chamber 86 for moving the valve member 82 clear of the valve seat and permitting foreign liquids to flow through the drain opening 80 and from the settling chamber. The electrical signal circuit 68 may include a timer for ensuring that, on water being detected by the detector contacts 64, the valve 74 remains open for a suitable time to drain foreign liquids from the settling chamber, for example, for a period of two to four seconds.

It is not necessary for the electrical signal circuit to be connected to the valve 74 and instead, if desired, a manual operating device may be provided for operating the valve 74 manually when an operator notices that the device 72 has been actuated.

To enable excess air to be drained from the trapping device, any suitable screw-threaded air bleed valves 98 are screwed into the wall 14 and extend to the inlet and outlet passages 26 and 28. When the valves are opened, air can flow freely from the settling chamber.

In use, the device is connected in series in a liquid supply line 80, such as a fuel line, by means of the screw-threaded regions 34 and 36. The supply liquid, in which foreign liquids such as water are contained, flows through the inlet passage 26 and the inlet chamber 30 through the foraminous side wall 52 into the settling chamber 24. In flowing through the foraminous side wall 52 the droplets of foreign liquid which are contained in the supply liquid are partially separated from the supply liquid by the foraminous wall 52 and further by virtue of the differences between the specific gravities of the foreign and the supply liquids. The heating of the foraminous wall enhances this separation. The foreign liquid settles to the bottom of the settling chamber 24. The purified supply liquid flows from the settling chamber 24 through the foraminous side wall 52 into the interior of the cage through the outlet chamber 32 and through the outlet passage 28 back into the liquid supply line.

As the volume of settled and trapped foreign liquid which is separated from the supply liquid increases, the line of demarcation between the settled foreign liquid and the supply liquid rises. When the foreign liquid reaches a predetermined level, the detector contacts 64 establish electrical contact with the foreign liquids. The circuit 68 connected to the contacts 64 can detect this and a signal can be emitted. This can result in an actuating signal being transmitted to the valve 74 to permit the foreign liquid which is trapped in the settling chamber 24 to be ejected therefrom.

The power source may be operable to heat the heating elements to a temperature substantially in excess of that required to enhance separation of foreign liquids from the fuel passing through the trapping device. By heating the foraminous wall sufficiently, foreign particles which have separated from liquids flowing through the foraminous wall 52 can be removed from the foraminous wall and caused to fall into the settling chamber 24, where they settle until they are removed through the opening 80. The foraminous wall is thus at least partly cleaned.

I claim:

1. In a trapping device comprising a settling chamber defined by a casing and having a lower zone for receiving foreign liquids having a specific gravity higher than that of a supply liquid, detecting means for detecting the presence in the settling chamber of such foreign liquids and means for separating such foreign liquids from the supply liquid as the foreign liquids and supply liquid pass through said chamber, the provision of an educer-operated drain outlet valve for draining the settling chamber, said educer-operated drain outlet valve comprising a valve seat arranged adjacent to a bottom region of said settling chamber and encircling a drain opening, a valve member for engaging said valve seat for closing said drain opening, means biassing said valve member against said valve seat for normally retaining the drain opening in its closed condition, a valve chamber adjacent to said valve seat and receiving at least said valve member, and an educer having a flow passage connectable to a compressed air source whereby flow of compressed air through said air passage creates suitable low pressure conditions in said valve chamber for moving said valve member clear of said valve seat and permitting foreign liquids to flow through said drain opening and from said settling chamber.

2. The trapping device of claim 1, wherein the educer comprises an educer chamber and an educer nozzle projecting into the educer chamber for creating relatively low pressure conditions in said educer chamber, the educer chamber being in fluid communication with the valve chamber.

3. The device of claim 1, wherein a control valve is connected between said educer and said compressed air source for controlling flow of compressed air to the educer and thereby controlling operation of the drain outlet valve.

4. The device of claim 3, wherein the detecting means is connected to an electrical signal circuit for emitting a signal to open said control valve in response to detection of a predetermined quantity of foreign liquids in said settling chamber.

5. A trapping device for a liquid supply line for trapping foreign liquids contained in a supply liquid, said foreign liquids having a specific gravity greater than that of the supply liquid, the device comprising:
- a tubular casing having an open upper end,
- an upper end piece sealingly mounted on the upper end of the casing,
- a settling chamber defined at least partly within the casing,
- inlet and outlet chambers in an upper zone of said settling chamber,
- an inlet leading into said inlet chamber,
- an outlet leading from said outlet chamber,
- a substantially imperforate wall separating said inlet and outlet chambers,
- flow paths connecting the settling chamber with the inlet and outlet chambers,
- foraminous wall means partly defining said inlet and outlet chambers, said foraminous wall means being arranged across the flow paths whereby liquid passing through the chambers from the inlet to the outlet passes through said foraminous wall means for separating foreign liquids from said supply liquid,
- means for heating said foraminous wall means primarily at least in the region of one said flow path, and
- detecting means for detecting the presence of a predetermined amount of foreign liquids in said settling chamber and connectable to an electrical signal circuit for responding by emitting a signal in response detection of said foreign liquids,
- a drain outlet valve provided in the casing for draining the settling chamber, the drain outlet valve comprising a non-return valve operable by an educer for creating low pressure conditions for opening said non-return valve.

6. In a fuel supply system for an engine:
- a settling chamber defined by a casing and an end wall and having a lower zone for receiving foreign liquids having a specific gravity higher than that of fuel for the engine,
- detecting means for detecting the presence in the settling chamber of foreign liquids having a specific gravity higher than that of fuel for said engine, said detecting means including an electrical signal circuit for emitting a signal in response to detection of such foreign liquids,
- inlet and outlet chambers in an upper zone in said settling chamber,
- an inlet leading into said inlet chamber,
- an outlet leading from said outlet chamber,
- foraminous wall means partly defining said inlet and outlet chambers whereby fuel passing through the chambers from the inlet to the outlet passes through said foraminous wall means, and
- heating means connected to an electrical power supply source primarily for heating said foraminous wall means at least in a region where fuel passes through said foraminous wall means,
- a drain outlet valve provided in the casing for draining the settling chamber, the drain outlet valve comprising a non-return valve including educer means connected to a compressed air source of said engine for creating low pressure conditions for opening said non-return valve and draining foreign fluids from said settling chamber.

7. The fuel supply system of claim 6 wherein said educer means comprising a valve normally preventing flow of compressed air from creating said low pressure conditions, said valve being operable by an electrical signal emitted by said electrical signal circuit in response to detection of the predetermined quantity of foreign liquids in the settling chamber.

8. The fuel supply system of claim 6 wherein said heating means being connected to said power supply source by variable power supply control means for controlling the heating of said foraminous wall means.

* * * * *